United States Patent
Johnson et al.

(10) Patent No.: US 9,324,082 B2
(45) Date of Patent: Apr. 26, 2016

(54) SYSTEM AND METHOD FOR PROVIDING INFORMATION TAGGING IN A NETWORKED SYSTEM

(75) Inventors: Brian Scott Johnson, Campbell, CA (US); Brian M. Johnson, Santa Clara, CA (US); Badrul M. Sarwar, San Jose, CA (US); Benny Soetarman, Fremont, CA (US); Rajyashree Mukherjee, San Jose, CA (US); Venkat Sundaranatha, San Jose, CA (US); Neelakantan Sundaresan, Mountain View, CA (US); Randall Scott Shoup, San Francisco, CA (US); Daniel Kramer, San Jose, CA (US); Jason M. Heidema, Sunnyvale, CA (US); Musaab At-Taras, San Jose, CA (US); Alvaro Bolivar, San Francisco, CA (US); Jean-David Ruvini, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 687 days.

(21) Appl. No.: 11/964,181

(22) Filed: Dec. 26, 2007

(65) Prior Publication Data

US 2009/0012991 A1 Jan. 8, 2009

Related U.S. Application Data

(60) Provisional application No. 60/948,253, filed on Jul. 6, 2007, provisional application No. 60/952,729, filed on Jul. 30, 2007.

(51) Int. Cl.
*G06Q 30/02* (2012.01)
*G06Q 30/06* (2012.01)
*G06F 17/30* (2006.01)

(52) U.S. Cl.
CPC .......... *G06Q 30/02* (2013.01); *G06F 17/30867* (2013.01); *G06Q 30/0603* (2013.01); *G06Q 30/0621* (2013.01); *G06Q 30/0623* (2013.01); *G06Q 30/0631* (2013.01)

(58) Field of Classification Search
USPC .................................. 707/740, 948
See application file for complete search history.

(56) References Cited

U.S. PATENT DOCUMENTS

| 6,038,668 | A | 3/2000 | Chipman et al. |
| 6,484,149 | B1 | 11/2002 | Jammes et al. |
| 7,107,226 | B1 * | 9/2006 | Cassidy ............. G06Q 30/0625 705/26.62 |

(Continued)

FOREIGN PATENT DOCUMENTS

WO WO-2009/008985 A1 1/2009

OTHER PUBLICATIONS

Schafer, E-commerce Recommendation Applications, 2001, pp. 115-123.*

(Continued)

*Primary Examiner* — Albert Phillips, III
(74) *Attorney, Agent, or Firm* — Schwegman, Lundberg & Woessner, P.A.

(57) ABSTRACT

A computer-implemented system and method for providing information tagging in a networked system is disclosed. The apparatus in an example embodiment includes a tag engine configured to process a database of categorized product listings; to receive a user-provided tag associated with at least one of the product listings; to retain the user-provided tag; and to serve the user-provided tag to a user viewing at least one of the product listings.

14 Claims, 14 Drawing Sheets

(56) References Cited

U.S. PATENT DOCUMENTS

| | | | |
|---|---|---|---|
| 7,555,503 B1* | 6/2009 | Neal et al. | |
| 7,668,821 B1* | 2/2010 | Donsbach et al. | 707/765 |
| 7,870,135 B1* | 1/2011 | Cheung | 707/737 |
| 8,560,398 B1* | 10/2013 | Gregov | G06Q 30/06 705/26.2 |
| 2001/0034694 A1 | 10/2001 | Elias | |
| 2002/0049763 A1* | 4/2002 | Seamon | 707/100 |
| 2003/0004966 A1 | 1/2003 | Bolle et al. | |
| 2003/0236791 A1 | 12/2003 | Wilmsen et al. | |
| 2004/0006556 A1 | 1/2004 | Kwoh | |
| 2004/0024769 A1 | 2/2004 | Forman et al. | |
| 2004/0064464 A1 | 4/2004 | Forman et al. | |
| 2004/0153378 A1 | 8/2004 | Perkowski | |
| 2004/0260621 A1* | 12/2004 | Foster | G06Q 30/02 705/26.62 |
| 2005/0004919 A1 | 1/2005 | Green et al. | |
| 2006/0037066 A1* | 2/2006 | Audebert | 726/5 |
| 2007/0078832 A1* | 4/2007 | Ott et al. | 707/3 |
| 2008/0082565 A1* | 4/2008 | Chang et al. | 707/102 |
| 2008/0091549 A1* | 4/2008 | Chang et al. | 705/26 |
| 2008/0114644 A1* | 5/2008 | Frank et al. | 705/14 |
| 2008/0215583 A1* | 9/2008 | Gunawardena et al. | 707/7 |
| 2008/0228749 A1* | 9/2008 | Brown | G06F 17/30796 |

OTHER PUBLICATIONS

Echarte, Ontology of Folksonomy: A New Modeling Method, 2004, pp. 1-8.*

Basilico Unifying Collaborative and Content-Based Filtering, 2004., pp. 1-8.*

HTML Tag Reference, 1998, pp. 1-17.*

"Mediariver.com", http://www.mediariver.com/products.html, 1 pg.

"International Application Serial No. PCT/US2007/008211, International Search Report and Written Opinion mailed Sep. 22, 2008", 10 pgs.

"Inxight Products", http://www.inxight.com/products/, (2006), 1 pg.

"Term Extraction Documentation for Yahoo! Search Web Services", http://developer.yahoo.com/search/content/V1/termExtraction.html, (2007), 2 pgs.

Broder, Andrei, et al., "A semantic approach to contextual advertising", *Proceedings of the 30th Annual International ACM SIGIR Conference on Research and Development in Information Retrieval*, (2007), 559-566.

Carmel, David, et al., "Automatic query wefinement using lexical affinities with maximal information gain", *Proceedings of the 25th Annual International ACM SIGIR Conference on Research and Development in Information Retrieval*, (2002), 283-290.

Chirita, Paul—Alexandru, et al., "Personalized query expansion for the web", *Proceedings of the 30th Annual International ACM SIGIR Conference on Research and Development in Information Retrieval*, (2007), 7-14.

Crochemore, Maxime, et al., "Direct construction of compact directed acyclic word graphs", *Proceedings of the 8th Annual Symposium on Combinatorial Pattern Matching*, (1997), 116-129.

Crochemore, Maxime, et al., "On Compact Directed Acyclic Word Graphs", *Structures in Logic and Computer Science*, (1997), 192-211.

Frank, E., et al., "Domain-Specific Keyphrase Extraction", *Proceedings of the Sixteenth International Joint Conference on Artificial Intelligence*, (1999), 668-673.

Hulth, Anette, "Improved automatic keyword extraction given more linguistic knowledge", *Proceedings of the 2003 Conference on Empirical Methods in Natural Language Processing*—vol. 10, (2003), 216-223.

Kraft, Reiner, et al., "Mining anchor text for query refinement", *Proceedings of the 13th International Conference on World Wide Web*, (2004), 666-674.

Lacerda, Anã-Sio, et al., "Learning to advertise", *Proceedings of the 29th Annual International ACM SIGIR Conference on Research and Development in Informaion Retrieval*, (2006), 549-556.

Resnick, Paul, et al., "GroupLens: an open architecture for collaborative filtering of netnews", *Proceedings of the 1994 ACM Conference on Computer Supported Cooperative Work*, (1994), 175-186.

Ribeiro-Neto, Berthier, et al., "Impedance coupling in content-targeted advertising", *Proceedings of the 28th Annual International ACM SIGIR Conference on Research and Development in Information Retrieval*, (2005), 496-503.

Turney, Peter D, "Learning Algorithms for Keyphrase Extraction", *Information Retrieval*, 2(4), (2000), 303-336.

Turney, Peter, "Learning to Extract Keyphrases from Text", *Canadian National Research Council, Institute for Information Technology*, NRC-41622, (1999), 1-45.

Witten, Ian, et al., "KEA: practical automatic keyphrase extraction", *Proceedings of the Fourth ACM Conference on Digital Libraries*, (1999), 254-255.

Yih, Wen-Tau, et al., "Finding advertising keywords on web pages", *Proceedings of the 15th International Conference on World Wide Web*, (2006), 213-222.

Zeng, Hua-Jun, et al., "Learning to cluster web search results", *Proceedings of the 27th Annual International ACM SIGIR Conference on Research and Development in Information Retrieval*, (2004), 210-217.

* cited by examiner

| TRAINING DATA | | | | |
|---|---|---|---|---|
| ITEM TITLE | BRAND = APPLE | COLOR = BLACK | MODEL = iPOD | CAPACITY = 30 GB |
| BLACK APPLE 30 GB iPOD | YES | YES | YES | YES |
| BLACK APPLE iPOD | YES | YES | YES | ? |
| APPLE iPOD 30 GB | YES | ? | YES | YES |
| BLACK iPOD 30 GB | ? | YES | YES | YES |
| RECOMMENDATION | | | | |
| TITLE INPUT TO ENGINE | BRAND RECO | COLOR RECO | MODEL RECO | CAPACITY RECO |
| BLACK iPOD | BRAND = APPLE (B/C WE SAW OTHER LISTINGS THAT HAD "BLACK" AND "iPOD" AS VALUES WITH THE VALUE OF "APPLE" IT IS LIKELY THAT "APPLE" IS CORRELATED TO THIS LISTING) | COLOR = BLACK (DIRECT MATCH TO EXISTING VALUE) | MODEL = iPOD (DIRECT MATCH TO EXISTING VALUE) | CAPACITY = 30 GB (B/C WE SAW OTHER LISTINGS THAT HAD "BLACK" AND "iPOD" AS VALUES WITH THE VALUE OF "30GB" IT IS LIKELY THAT "30 GB" IS CORRELATED TO THIS LISTING) |

*FIG. 6*

ITEM SPECIFICS 

ENTER SPECIFICS ABOUT YOUR ITEM HERE TO HELP BUYERS FIND YOUR LISTING. EBAY WILL INDEX THE MOST COMMON SPECIFICS FOR KEYWORD SEARCH ON EBAY.COM

CONDITION

ERA
 REMOVE

MATERIAL
REMOVE

ADD MORE SPECIFICS
⊕ COLOR   ⊕ WIDTH   ⊕ BRAND   ⊕ CHAIN   ⊕ MATERIAL
⊕ ADD A CUSTOM DETAIL

FIG. 8

HOME > SELL > CREATE YOUR LISTING

SELL: CREATE YOUR LISTING

THE CATALOG ITEM YOU PICKED HAS RECENTLY CHANGED. THIS MAY AFFECT YOUR ITEM SPECIFICS

? HELP   SHOW/HIDE OPTIONS

WHAT YOU'RE SELLING ?

CATEGORY ?
CLOTHING, SHOES & ACCESSORIES > MEN'S SHOES
CHANGE CATEGORY

FIG. 9

HOME > SELL > CREATE YOUR LISTING

SELL: CREATE YOUR LISTING

TELL BUYERS ABOUT YOUR ITEM
- TO GET HELP: CLICK ⓘ
- TO SHOW OR HIDE OPTIONAL FEATURES, E.G. INTERNATIONAL SHIPPING, ON THIS PAGE, CLICK THE SHOW/ HIDE OPTIONS LINK

HELP | SHOW/HIDE OPTIONS

WHAT YOU'RE SELLING ⓘ

CATEGORY ⓘ
CLOTHING, SHOES & ACCESSORIES > MEN'S ACCESSORIES > HATS > BALL CAP > OTHER BALL CAPS
CHANGE CATEGORY

DESCRIBE YOUR ITEM ⓘ

TITLE * ⓘ
[ ]

SUBTITLE ($0.50) ⓘ
[ ]

ITEM SPECIFICS ⓘ
ENTER SPECIFICS ABOUT YOUR ITEM HERE TO HELP BUYERS FIND YOUR LISTING. EBAY WILL INDEX THE MOST COMMON SPECIFICS FOR KEYWORD SEARCH ON EBAY.COM

CONDITION
[ ▽ ]

ERA
[ ] ▽ REMOVE

ENTER DETAIL LABEL
ENTER DETAIL       REMOVE

ADD MORE SPECIFICS
⊕COLOR  ⊕WIDTH  ⊕BRAND  ⊕CHAIN  ⊕MATERIAL
⊕ADD A CUSTOM DETAIL

PICTURES (FIRST PICTURE IS FREE. EACH ADDITIONAL PICTURE IS $0.15)

[ADD PICTURES] | 6 REMAINING | REMOVE

☐ GALLERY PICTURE $0.35 ⓘ
DISPLAY A PICTURE IN SEARCH RESULTS TO HELP BUYERS FIND YOUR ITEM
WITHOUT GALLERY PICTURE                          $x.xx  $x.xx  0H 00M
HOW YOUR LISTING WILL APPEAR IN SEARCH RESULTS

🔍 PREVIEW

DESCRIPTION * ⓘ
[STANDARD] [HTML]
[ARIAL ▽] [10 ▽] A▽ | B I U | ≡ ≡ ≡ | ≔ ≟ ≛ ≛ | ✓ CHECK SPELLING

*FIG. 10*

← BACK TO LIST OF ITEMS LISTED IN CATEGORY: CAMERAS & PHOTO > DIGITAL CAMERAS > POINT & SHOOT > 6.0 TO 6.9 MEGAPIXELS > CANON

BRAND NEW CANON POWERSHOT SD700 IS DIGITAL ELPH 6.0 MP | ITEM NUMBER: 290087192097

YOU ARE SIGNED IN | WATCH THIS ITEM IN MY EBAY | EMAIL TO A FRIEND

| | | MEET THE SELLER |
|---|---|---|
| | CURRENT BID: C $305.00 [PLACED BID>] (APPROXIMATELY US $262.05) | SELLER: DSMEAGLE(1541 ☆) ✦ POWER ME SELLER FEEDBACK: 99.5% POSITIVE MEMBER: SINCE FEB-03-00 IN CANADA |
| | END TIME: 3 HOURS 9 MINS (FEB-28-07 10:12:54 PST) SHIPPING COSTS: TO UNITED STATES – C $50.00 CANADA POST EXPEDITED PARCEL – USA SERVICE TO UNITED STATES (MORE SERVICES) | • READ FEEDBACK COMMENTS • ASK SELLER A QUESTION • ADD TO FAVORITE SELLERS • VIEW SELLER'S OTHER ITEMS: STORE/ LIST • VISIT SELLER'S STORE ⌂ KBS ELECTRONICS |
| VIEW LARGER PICTURE | SHIPS TO: CANADA, UNITED STATES, UNITED KINGDOM ITEM LOCATION: VANCOUVER, BC, CANADA HISTORY: 21 BIDS HIGH BIDDER: USER ID KEPT PRIVATE | BUY SAFELY 1. CHECK THE SELLER'S REPUTATION SCORE: 1541/99.5% POSITIVE READ FEEDBACK COMMENTS 2. CHECK HOW YOU'RE PROTECTED PAYPAL THIS ITEM IS COVERED UP TO $2,000 SEE ELIGIBILITY |
| | YOU CAN ALSO: [WATCH THIS ITEM] GET ALERTS VIA TEXT MESSAGE OR IM SELL ONE LIKE THIS | |

LISTING AND PAYMENT DETAILS: SHOW

DESCRIPTION

ITEM SPECIFICS – DIGITAL CAMERAS

DIGITAL CAMERA TYPE: POINT & SHOOT   OPTICAL ZOOM: 4X
DIGITAL CAMERA BRAND: CANON   MANUFACTURER WARRANTY: YES
RESOLUTION (MEGAPIXELS): 6   CONDITION: NEW, NEVER OPENED
BUNDLED KITS: —

[TAG DISPLAY AREA]

THIS TRANSLATION IS PROVIDED AS A SERVICE. EBAY CANNOT GUARANTEE ITS ACCURACY   VIEW ITEM SPECIFICS IN ORIGINAL LANGUAGE

SYSTEM AND METHOD FOR PROVIDING INFORMATION TAGGING IN A NETWORKED SYSTEM

CROSS-REFERENCE TO RELATED APPLICATIONS

This non-provisional patent application claims the benefit of the filing date of U.S. Provisional Patent Application Ser. No. 60/948,253; filed Jul. 6, 2007; and entitled, "INFORMATION TAGGING SYSTEM", the content of which is incorporated by reference herein.

This non-provisional patent application claims the benefit of the filing date of U.S. Provisional Patent Application Ser. No. 60/952,729; filed Jul. 30, 2007; and entitled, "IMPROVING ACCURACIES OF CORRELATIONS PROVIDED IN AN ELECTRONIC PUBLICATION SYSTEM", the content of which is incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2007, eBay Inc., All Rights Reserved.

BACKGROUND

1. Technical Field

This disclosure relates to methods and systems supporting online searching and transactions. More particularly, the present disclosure relates to providing information tagging in a networked system.

2. Related Art

Electronic shopping systems currently exist which permit merchants to sell inventory to consumers over a computer network. Merchants now use computers to publish information about their products on one or more electronic pages (e.g., text and graphics displayable on a computer screen) and to elicit product orders from consumers. Likewise, consumers use computers to access information describing products and to communicate orders to a merchant.

With the increasing popularity and accessibility of the Internet, and particularly the World Wide Web, the number of merchants using and desiring to use the World Wide Web to advertise and sell products is growing rapidly. The World Wide Web is a global information system in which information is exchanged over the Internet using a set of standard protocols. An existing Web-based electronic store typically comprises a collection of Web pages which describe inventory and which include on-line forms allowing consumers to place orders or bids. Consumers use Web browsers to access the Web pages of electronic stores to examine information about available products and to submit product orders.

Merchants attempt to accurately describe their products or services in listings so the listings will be found by a high percentage of potential buyers who may be searching for similar products using network search engines. However, sellers often do not describe their offerings in a manner that maximizes their exposure to a large number of buyers. Further, on-line searching can be complicated by the large number of sellers, large number of product/service offerings, and the rapidly changing e-commerce marketplace.

U.S. Pat. No. 6,484,149 describes a system and method for designing and operating an electronic store to (1) permit a merchant to organize and advertise descriptions of product inventory over the Internet, (2) permit Web page information to be extracted on-demand from a product inventory database, and (3) permit Web pages to be automatically customized to fit shopping behaviors of individual consumers. A graphical store design user interface of a Web browser displays a hierarchical representation of products and, product groups of an electronic store. A user manipulates icons of the Web browser store design user interface to cause a Web server to modify relationships between products and product groups stored in a product information database. A store designer creates HTML template files, embeds database and customize references within the template files, and assigns template files to groups or products of the electronic store.

U.S. Pat. No. 6,038,668 describes a networked catalog search, retrieval, and information correlation and matching system. The system allows suppliers to publish information in electronic catalogs, structure the information in an object oriented representation distributed across a network of computers, for example, the Internet. The system also enables customers to search and retrieve information on products and suppliers which match dynamically specified customer requirements. Through retrieving compliant HTML pages, a search engine forwards retrieved pages to an object oriented database which sorts received information by the information's internal organization structure. By searching the information as stored in the knowledge base, a user may quickly retrieve the stored information as highly tailored to the user's search strategy.

Thus, a computer-implemented system and method for providing information tagging in a networked system is needed.

BRIEF DESCRIPTION OF THE DRAWINGS

Embodiments illustrated by way of example and not limitation in the figures of the accompanying drawings, in which:

FIG. 6 illustrates an example of the processing performed by the correlation engine of the tag generator of a particular embodiment.

FIG. 8 illustrates an example of the user interface for providing item specifics.

FIG. 9 illustrates an example of a user warning message.

FIGS. 10 and 11 illustrate an example embodiment of the Describe Your Item (DYI) page and a Sell Your Item (SYI) page with seller tagging.

FIG. 13 illustrates an example of a view item page with associated seller tags.

DETAILED DESCRIPTION

Figure 1:
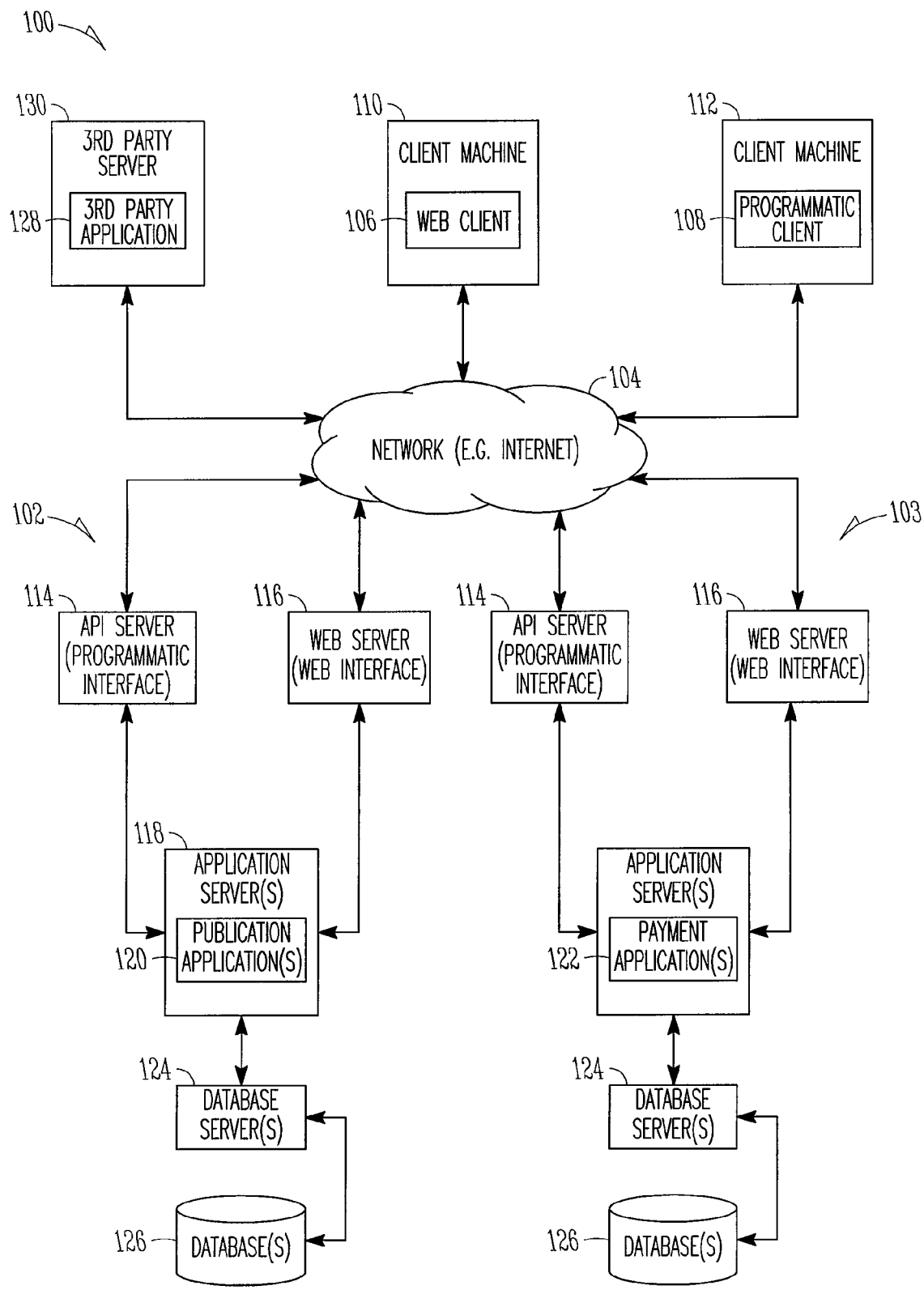
FIG. 1 is a block diagram of a network system on which an embodiment may operate.

In the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a computer-implemented system and method for providing information tagging in a networked system. The example system includes an information tagging generator to obtain user input and to generate information tags based on the user information. Various embodiments are described below in connection with the figures provided herein.

Seller Tagging, according to an example embodiment, provides a method for recommending name/value pairs (e.g. tags) for publications (e.g., listings across all categories on a host site). An example seller tagging system may provide both scalability and responsiveness. The seller tagging infrastructure achieves this by creating a machine learning system that is trained and tuned by data collected from both sellers and buyers.

"Seller Tags" may, in an example embodiment, constitute name/value pairs of item attributes that sellers can use to describe their listings. The new tag system may allow a community to determine what tags may be used as well as providing a basis for recommending tags to subsequent sellers. The community data may be used by a machine learning system to auto-tag listings with tag information.

Using the functionality described in the various embodiments provided herein, community members/users can tag (i.e. classify with a keyword or phrase) an object (e.g. an item, or listing) on a host site. For example, a seller can tag an item s/he is offering for sale as ?vase?, ?Fenton?, or ?vintage? item. Someone viewing the item at the host site can add the tag of, for example, ?red?. Other users can similarly add tags to further describe or classify the item on the host site as offered by the seller. In this manner, an object can be associated with a plurality of tags provided by a plurality of users. The tags provided by the community members/users can be public or private tags. A public tag is visible to any community members/user. A private tag is visible only to the tag creator or someone authorized by the tag creator to view the private tag. Private tags can be used to create lists (e.g. wish lists). Additionally, private tags can be created by a user for an authorized audience (e.g. friends, fans, subscribers to a favorite seller list, or items found by a personal shopper for a client).

An example seller tag, in an example embodiment, may consist of two parts:
 tag "name" (left side)
 tag "value" (right side)

Tags may be defined independently by sellers/community members or may be provided as recommendations. Tags may also be inferred by a publication or host system (e.g., eBay) and written to items in the background. Sellers may have the ability to choose from existing tag names and values or create new names and values. In a particular embodiment, tags may also be implemented with several additional features as defined below:

Tags may not be "required" for listing
 Users may be able to add additional tag values
 Users may be able to add additional tag names
 A configurable pre-defined maximum number of seller supplied tags per listing may be enforced.
 A configurable pre-defined maximum number of characters per tag name may be enforced.
 A configurable pre-defined maximum number of characters per tag value may be enforced.

Figure 4:
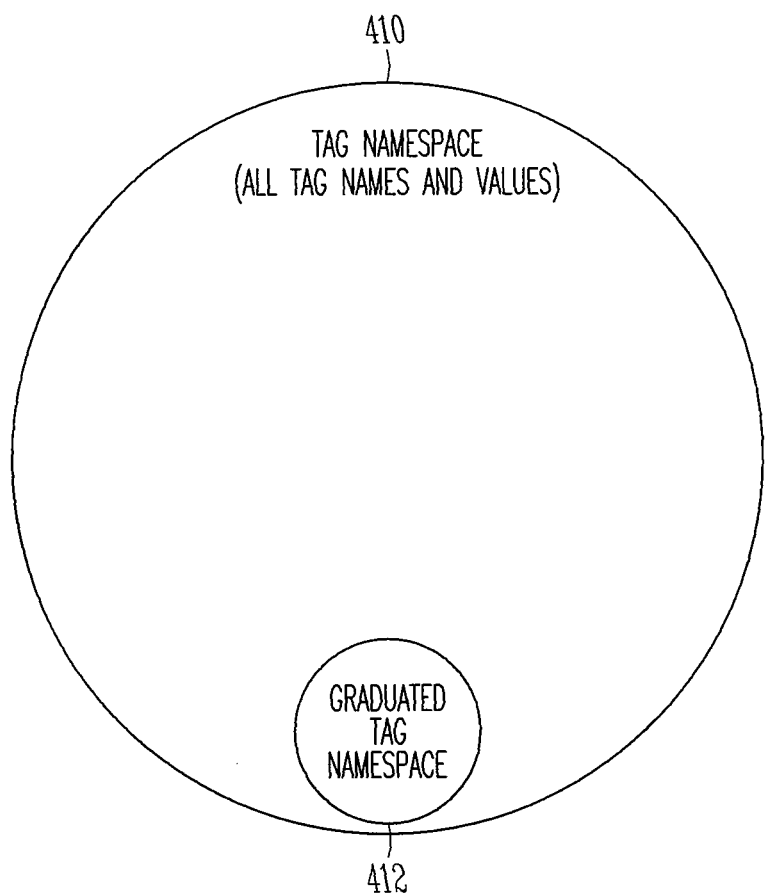
FIG. 4 illustrates the relationship between the tag namespace and the graduated tag namespace in a particular embodiment.

Each tag may be stored with associated information denoted as tag metadata. The metadata associated with each tag may include descriptors for the name and/or the value of the tag. The various tag descriptor metadata in a particular embodiment includes the following:

Names:
 Site
 Graduated vs. Non-graduated
 Creation date (to incorporate freshness into the popularity computation)
 Last modification date
 Thumb (up, down, none)
 Thumb modification date
Value:
 Site
 Graduated vs. Non-graduated
 item count
 popularity score
 Creation date (to incorporate freshness into the popularity computation)
 Last modification date Referring to FIG. 4, within the seller tag namespace of a particular embodiment, we can define a concept of the full set of tags (names and values) 410 and a subset of the set of tags (names and values) 412, which may be referred to as the Graduated Tag namespace. It is this set of tags that may be leveraged for recommendations, indexing, and in subsequent phases, navigation. In order to steer convergence towards "good" tags, we may create a "graduated" tag namespace 412. This pool of tags may be a subset of the full tag namespace 410 and used for making recommendations to sellers, as well as deciding which tags may be indexed as keywords. When tags become available to navigation, only graduated tags may be available for navigation.

Graduation and demotion of tags may be performed as an offline process, where it is decided which tags may be included and excluded from the graduated set. This process is where supply and demand data are leveraged for the purpose of updating the graduated set. In a particular embodiment, the offline process may be run once a day. The high level operations performed during this process in a particular embodiment are as follows:

1. Review all seller confirmed tags on successfully completed listings
2. Identify tags that have reached a critical threshold and may be included in the graduated set
3. Identify tags that no longer reach a critical threshold and may be removed from the graduated set
4. Check for tags to be included or excluded as defined by external sources
5. Update the graduated tag namespace Supply and demand data are valuable sources of information as we decide which tags may be graduated and demoted. Supply data may be gathered by looking at occurrences of a given name or value over all listings within a given category.

By doing this, we are able to mitigate spam or irrelevant tags. Demand data may be addressed by looking at successfully completed listings only. Looking at successfully completed listings only may provide some measure that the information on the item was of good quality and not misleading thereby helping us to mitigate spam or irrelevant tags.

Example:
Seller action: A seller tries to game the system by writing "Brand=Toshiba Dell Sony IBM Apple" on their item. Their hope is that we may index all those values or that in browse/search their item might be available under any of the specific brands.
Result: Supply data for this value is low because not many other sellers listed with the same value. Demand data is low because the item likely did not complete because of a confusing description. A tag value does not get inserted into the graduated set resulting in no indexing of the value as well as no subsequent recommendation of value.

In order to identify which tags qualify for graduation, we may in an example embodiment look at the following data elements:
Item count by tag (name and value)
Total item count of respective category
Date last seen These elements may enable us to identify if a given name or value meets the graduation threshold. Depending on whether or not a given tag meets the graduation threshold, the tag may be eligible for no action, graduation, or demotion. In a particular embodiment, the graduation threshold may be based on the following two variables:
Popularity score
Tag name or value count/total item count=popularity score
Minimum item count
Note: the threshold may also take into account a time factor so that we may steer our graduated set to tags that are relevant to the current date.

These variables, among others used in alternative embodiments, provide information related to the ubiquity of a particular tag and the degree to which users have used the tags. This information can be used to weed out unpopular or unhelpful tags from the graduated set. Configuration of the threshold may be global and not category specific. An example illustrating the graduation threshold is provided below. For this example, assume there may be 100 total listings in a product category called "Widget". As part of this category, there may be several values for the example 'Brand' tag as set forth below.

| | |
|---|---|
| 20 listings where Brand = Foo | popularity score for "Foo" = 20% |
| 15 listings where Brand = Zap | popularity score for "Zap" = 15% |
| 10 listings where Brand = Howza | popularity score for "Howza" = 10% |
| 2 listings where Brand = Gazz | popularity score for "Gazz" = 2% |

Statistical analysis techniques may be used to process the data as in the example above. Using these techniques, we can determine that most of the item counts and popularity scores for the data samples cluster between 10 and 20. In the example above, we may define our "threshold"=popularity score of 8% or higher AND a minimum item count of 12. Based on this example threshold, the tag values of 'Foo' and 'Zap' only may be eligible for graduation. Tag value 'Howza' would have met the popularity score threshold but not the minimum item count threshold. As such, this tag may not be eligible for either a graduation or demotion action. Tag value 'Gazz' would not have met either of the thresholds and therefore may be subject to demotion. Exact configuration of the graduation threshold may take place within the tag engine 500 described in more detail below.

Once we have identified which names and values meet our graduation threshold, we make updates to the graduated set by performing the following actions:
Eligible names and values in a new set may be compared against the names and values in the previous graduated set.
The difference between the current set and new set may be identified.
A comprehensive set of changes may be identified.
The graduated set may be updated by adding new names and values to the graduated set that were found to be eligible for graduation.
The graduated set may be updated by removing current names and values from the graduated set that were found to be subject to demotion.

Tag Engine

Figure 5:
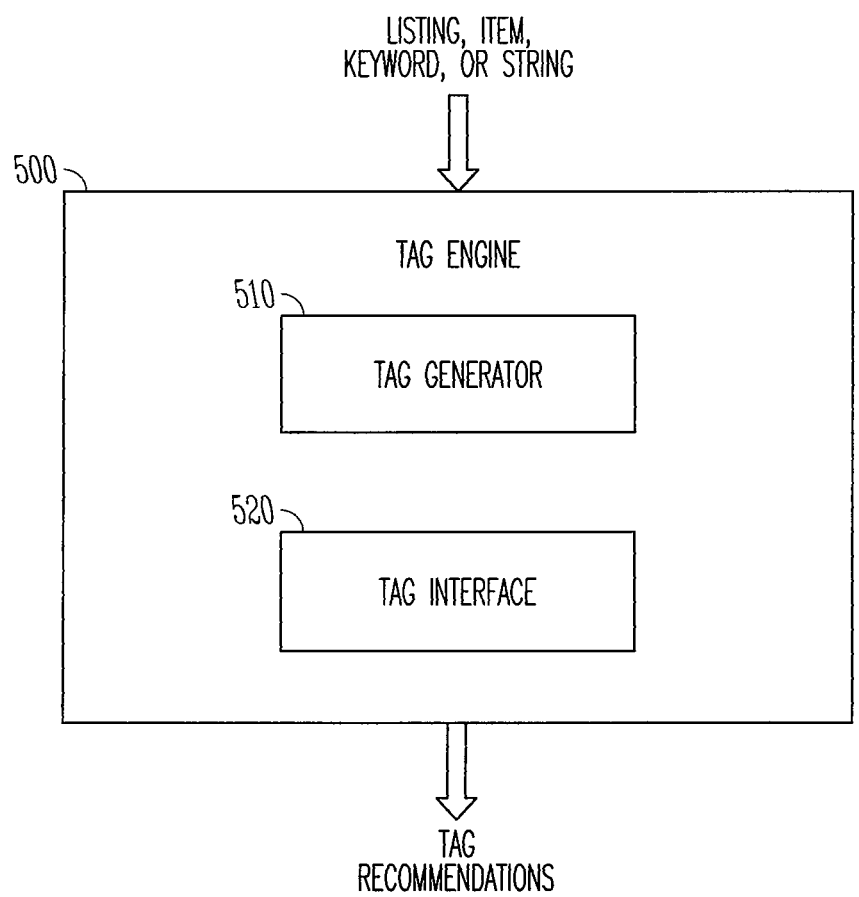
FIG. 5 illustrates the structure of the tag engine of a particular embodiment.

Referring now to FIG. 5, the tag engine 500, in an example embodiment, includes a naive Bayes classifier as part of tag generator 510. A naive Bayes classifier is a conventional probabilistic classifier based on applying the well-known Bayes' theorem with strong (naive) independence assumptions. Depending on the precise nature of the probability model, naive Bayes classifiers can be trained very efficiently in a supervised learning setting. In many practical applications, parameter estimation for naive Bayes models uses the method of maximum likelihood; in other words, one can work with the naive Bayes model without believing in Bayesian probability or using any Bayesian methods. The particular application of this technique is used to classify tags as described herein. In a particular embodiment, given a set of training data (items) together with their tags, a probabilistic model can be formed that may allow us to make correlations between items and tags. As more data is made available to the system, the classifier becomes more effective and the recommendations produced by the classifier become better.

At a high level there are two components to the tag engine 500 of a particular embodiment as shown in FIG. 5:
1) A tag generator 510 for training and building the probabilistic data model; and
2) A tag interface 520 serving as the interface for tag recommendations and normalization.

Each of these components of the tag engine 500 of a particular embodiment are described in more detail below.

Tag Generator

The tag generator 510, in an example embodiment, includes a correlation engine or classifier that implements a process during which name/value pairs may become associated with "keywords". The keywords may be entered by users of a host system during product/service searches or purchase/bidding transactions. Portions of the name/value pairs can be matched with portions of the keywords or keyword strings. In this manner, the correlation engine of the tag generator 510 of a particular embodiment can derive probabilistic matches. The training data used to train the correlation engine may be data similar to the examples described above in relation to graduation. We may leverage successfully completed listings (representing demand data) as well as counts of names and values on all listings (supply data). Once we have this data, the system may use statistical correlation to make recommendations for relevant names and values. An example of the processing performed by the correlation engine of the tag generator 510 is illustrated in FIG. 6. As shown in FIG. 6, a set of training data with items and associated tags (e.g. brand, color, model, and capacity) can be used to form corresponding recommendations associated with a new item (e.g. Black iPod). The tag generator 510 can use the training data to recommend various tags for the new item based on correlations between the new item title and the training data.

As the model is built by the tag generator 510, the system may also associate a confidence factor with each recommendation the tag generator 510 makes. In the example illustrated in FIG. 6 and described above, it is likely that "black" and "iPod" of the new item may be very confident recommendations; because we see a direct correlation of a keyword in the title to an existing value in the training data. The confidence factors for "apple" and "30 GB" would likely be lower; because it is a less direct correlation.

As a particular implementation of the tag generator 510 receives more data, these correlations grow stronger as they are reinforced by additional listings or weaker if the correlation is not repeated with other listings. Additionally, our ability to make confident correlations in what appear to be distant name value pairs may increase as the training set of data grows.

Tag Interface

The tag interface 520 of the tag engine 500, in an example embodiment, may serve as the interface for all aspects of tag recommendations and normalization outputs produced by the tag engine 500. These outputs may include the following:

Recommendations for tag names and values by category
Listing specific recommendations
A reconciled set of names and values for Sell Your Item (SYI) user interfaces and application programming interfaces (API) used to access and use a host database of categorized product and service information. The Sell Your Item (SYI) user interface in a particular embodiment is intended for real-time user interaction via a web browser. The API interface is intended for programmatic access to the tag engine 500 via an application program.
Spell checking suggestions
Unit of measurement normalization suggestions The inputs to the tag engine 500, in an example embodiment, can include the following items of information:

Product/Service Category ID
Title
Seller approved name-value pairs

The available inputs may also include product ID, and/or a product/service description.

In order to provide guidance to sellers regarding which names and values might be most helpful given a listing in a particular category, the tag engine 500 can support returning names and values for a given category in a priority order. These names may be returned from the graduated set only.

Because much of a host infrastructure is typically embedded in product/service categories, product/service categories can be used as a reference for names and values. However, product/service categories may not necessarily be the primary association of a group of listings used to derive recommendations. Our first association of a group of listings used to derive recommendations for the tag engine 500 may be at the domain level. This may be useful to ensure normalization across categories within a domain. An example of this is provided below. In the example below, we assume we have two cell phone categories within the cell phone domain. These categories can be:

Cell Phones & PDAs>Cell Phones>Phones w/o Service Contracts
Cell Phones & PDAs>Cell Phones>Phones with Service Contracts The example product/service categories shown above may not necessarily be the primary association of a group of listings used to derive recommendations.

As described above, the tag engine 500 can support returning names and values for a given category in a priority order. In a particular embodiment, the tag engine 500 may set priority for listing tag names as follows:

Names with "thumbs-up" at top of list
If multiple names are given thumbs up, secondary sort by popularity may be used, and a last sort may be alphabetical and numeric with numbers first from lowest to highest
All other graduated names by popularity score In a particular embodiment, the tag engine 500 may set priority for listing tag values as follows:

All values for a given name by popularity score

The tag engine 500 may take any combination of the data elements below as inputs for suggesting tags. Typically, the more inputs provided to the tag engine 500, the better the recommendations may be.

Because of the frequency and functionality required for getting names and more importantly values, lookup tables may be created for this use. As the offline process is run to identify the most current graduated set of tags, lookup tables for tag names and values by category/domain may also be created. These tables may be leveraged in real time in Sell Your Item (SYI) seller interface interactions as sellers are typing in names and values. The lookup tables may enable us to provide auto-complete functionality to aid sellers' converging on common language to describe their items. For a name lookup and given a category identifier, names may be returned in priority order and lookup tables to search against may be provided. For a value lookup and given a tag name, values may be returned in priority order and lookup tables to search against may be provided.

In some cases the tag engine 500 may only be provided with a category. In these cases the tag engine 500 may return top tag names with top values for each name. The number of names and values may be an input to the application programming interface (API) and can be configured by the client.

The tag engine 500 may, in an example embodiment, provide recommendations on names and values for any given listing. This functionality may also allow us to auto-tag listings with name value pairs. The way the tag engine 500 goes about creating category specific recommendations is described above. Below we may describe how the results are formulated into usable data for SYI and API interfaces. As explained above, SYI and API interfaces are a user web interface (Sell Your Item, SYI) and an application programming interface (API) for accessing and using a host database of product/service information. The inputs from SYI/API interfaces may include the following data items:

Category ID
Title
Seller authored name-value pairs

When prompted for top names by the SYI interface, the tag engine 500 may return the top tag names in "priority" order as described above. When prompted for item level recommendations by SYI interface, the tag engine 500 may return up to a pre-determined limit (e.g. 15) of tags as follows:

Tags 1-2 are top tag names by category.
Tags 3-15 are tags most relevant to a listing as determined by the tag engine 500. In order for tags to be included, they may need to meet a minimum confidence factor as determined by the tag engine 500.

All tags may be returned with the most relevant pre-determined number (e.g. 10) values as determined by the tag engine 500. These may be sorted alphabetically.

Top suggested values that meet a minimum confidence factor may be returned with an instruction to "pre-fill". For tags in the "top section" of the user interface, they may show as pre-filled upon receiving the data from the tag engine 500. For tags in the "suggested" section, the pre-filled value may be held until the user attempts add that tag to the top section.

When prompted for an item level recommendation by the external API (e.g. GetItemRecommendations), the tag engine 500 may return up to a pre-determined number (e.g. 15) of tags as follows:

Tags 1-2 are top tag names by category

Tags 3-15 are tags most relevant to a listing as determined by the tag engine 500. Tags may need to meet a minimum confidence factor as determined by the tag engine 500 to be returned.

Values that meet a minimum confidence factor may be returned with tag name.

The tag engine 500 may provide the SYI interface functionality to perform a spell check and provide suggestions to the user as they enter new tag names or values. A conventional spell checker may be leveraged by the tag engine 500 for this purpose. The SYI interface may make a generic "normalization" call to the tag engine 500 any time a name or value is entered that does not exist in the graduated set of names/values. The tag engine 500 may check the string for both spelling and Units of Measure (UOM) suggestions. If a suggestion exists, the tag engine 500 may return the value along with the type of suggestion (spelling or UOM).

The interaction with the SYI interface for UOM normalization may work in concert with spell checks and in the manner described above. In order to drive further normalization, the most popular among matching normalized values may be identified for display within recommendations. This may be accomplished by looking up by normalized (lower-cased & stripped of some punctuation) name in a database of lookup tables and returning the most popular (w/highest item count) display name/value associated w/the normalized input query.

Example:
We receive the following values:
JK Rowling (150 items)
JK ROWLING (30 items)
J.K. Rowling (200 items)
J.K. ROWLING (68 items)
With our rules, these may be normalized on the back end to:
jk rowling This normalization is very helpful because we may treat all of these values as a single entity, thereby not diluting recommendations. Additionally, this may help with navigation as we would not see the various values in navigation. We store the most popular display, in this case:
J.K. Rowling This version may be used in all future recommendations as well be available for display in navigation.

In a particular embodiment, the SYI interface interacts with the tag engine 500 using four different types of calls. These SYI/tag engine 500 interface calls are listed below:

1. Get Recommendations Call: In this call, the SYI interface may feed the tag engine 500 with category and title information and the SYI interface may receive recommendations for names/values from the tag engine 500. This recommendation may contain pre-filled text for values.

2. Name Lookup: This call may be a real-time lookup used for the purpose of storing names and performing auto-complete functionality on names.

3. Value Lookup: This call may be a real-time lookup used for the purpose of storing/presenting the top X values per name and for auto-complete functionality on values.

4. Normalization Call: This call may be in real time as the SYI interface identifies a name or value being entered outside of the graduated set. The string may be passed and the tag engine 500 may return 0 recommendations, a spelling recommendation, or a UOM recommendation.

Figure 7:
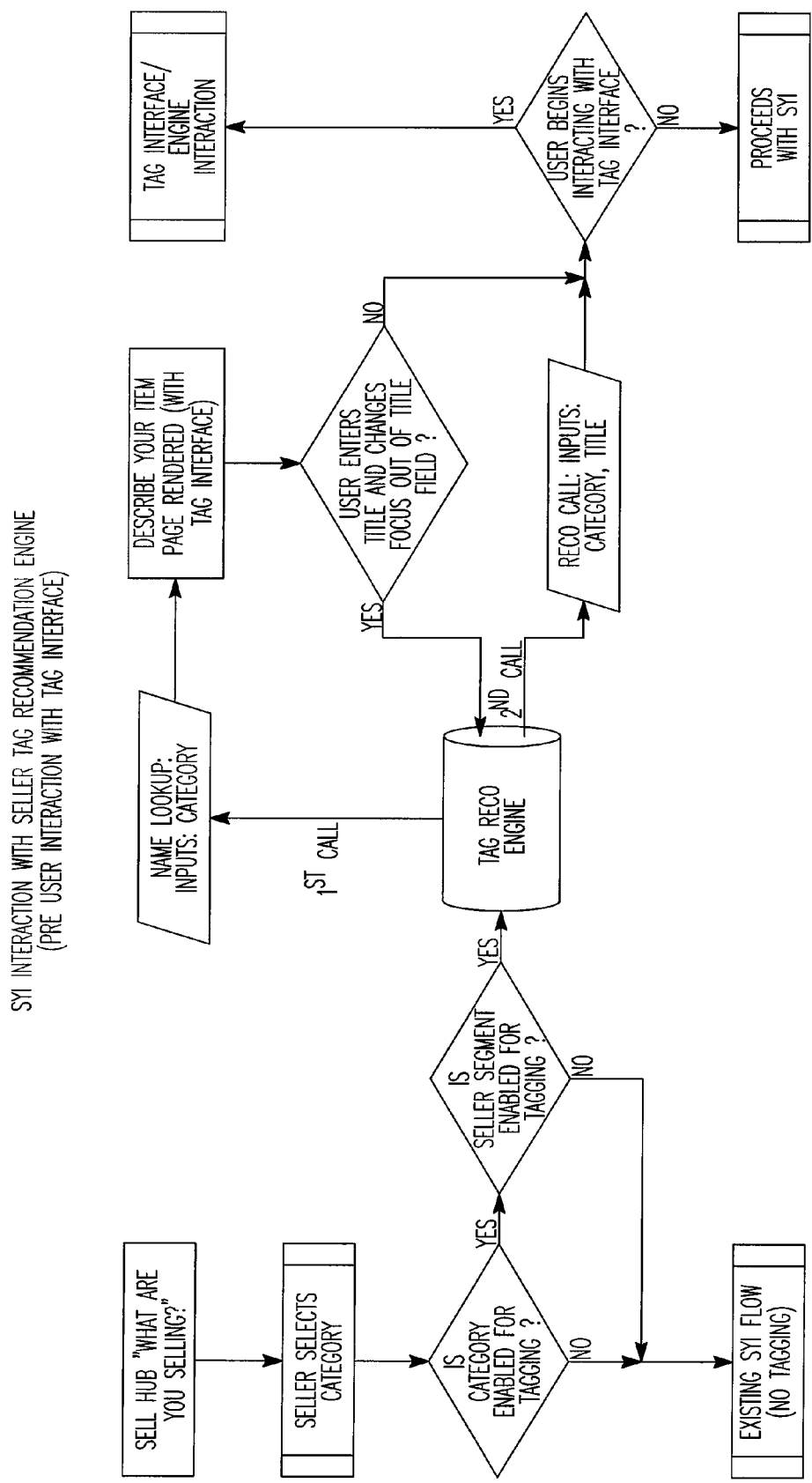
FIG. 7 illustrates a particular embodiment of the SYI interface interaction with the tag engine.

A particular embodiment of the SYI interface interaction with the tag engine 500 is illustrated in FIG. 7.

Because of the use of the item title to make tag recommendations on the page, we may update the tag data when the user moves focus out of the title field. As focus leaves title, we may provide a visual cue that the tag section is being updated. The inside of the item specifics box may have a semi-transparent grey overlay with the loading animated image in the center. An example of the user interface for providing item specifics is illustrated in FIG. 8.

In order to accommodate cases where a seller may enter tags prior to the title, or return to edit the title after editing tags, we may keep track of activity in the tag interface section as follows:

If any tag value has been selected or edited, it may not be modified.

If a suggested tag has been added to the top section, it may remain.

If a custom tag has been added to the top section, it may remain.

If any given tag has been removed from the top section, it may remain removed.

Pre-populated values in the top two tags that have not been edited may be updated, but the top two tags may maintain their order and may not be updated.

Tags without any value provided may be updated with a value or removed.

Tags may be ordered in any manner. In a particular embodiment, the top two tags may retain their placement within the interface. The only reason a top two tags would not continue in their location is if the user explicitly removed that tag. Subsequent tags may be ordered with user selected or edited first and additional/new tags returned from the tag engine 500.

In the case where a seller selects to edit the category, we may not retain any tag data. After selecting a new category and returning to the Describe Your Item (DYI) page, we may call the tag engine 500 again to get new tag data. From this point, all interaction may mirror that of a seller accessing the page from a first pass. If a seller is changing from a category that does not have seller tagging enabled, to a category that does have tagging enabled, we may call the tag engine 500 as the seller returns to the page. A seller is warned that after they change their category and land on the Describe Your Item (DYI) page, that the resulting change could have affects on their item specifics. An example of this warning message is shown in FIG. 9. The same language as used for attributes may apply as both attributes and tags are referred to as item specifics. This behavior is consistent with how item specifics are treated.

Figure 11:

In a particular embodiment, a tag interface provides a process by which a user may enter information that describes a product offered for sale and in so doing provides tag information. In a particular embodiment, we may modify the order of some sections on the Describe Your Item (DYI) page. This ordering may apply to versions of the Sell Your Item (SYI) page with and without seller tagging (including attribute enabled categories) The order may be as shown in the example user interfaces shown in FIGS. 10 and 11 and summarized below.
   What you're selling:
   Category info
   Pre-filled item info
   Describe your item:
   Title
   Subtitle
   Tag/Item Specifics section
   Pictures (previously above tag/item specifics section)
   Description In a particular embodiment, there are four different sections within the tag interface area as shown in FIG. 11. FIG. 11 illustrates an Attribute section. Even though we are targeting seller tagging at categories that are not attribute-enabled, we may need to make some considerations for categories that have either a global attribute or an attribute such as condition shown. If seller tagging is enabled when there are attributes in the category, the attributes may display within the tag section, but above all tags. FIG. 11 also illustrates a "Top Section". This section is where tag names and values are returned. FIG. 11 also illustrates a Custom Tag Entry element. This element appears when the seller selects "enter a custom detail" within the suggested tags section. Additional suggested tag names are shown in the Suggested Tags section as shown in FIG. 11. In the case where the tag engine 500 does not return any names or name value pairs, the interface may display an appropriate message informing the user of such. In the case that the tag engine 500 does not return any names or name value pairs but there are attributes for a given category, the interface may display an appropriate message informing the user of such. In the case where the tag engine 500 does not have enough recommendations to populate any in the suggested section, the interface may display an appropriate message informing the user of such. In the case where the tag engine 500 does not return enough recommendations to fill the suggested section, the interface may display an appropriate message informing the user of such. If the tag engine 500 returns a full set of recommendations, the display may be as shown in FIG. 11.

Figure 12:
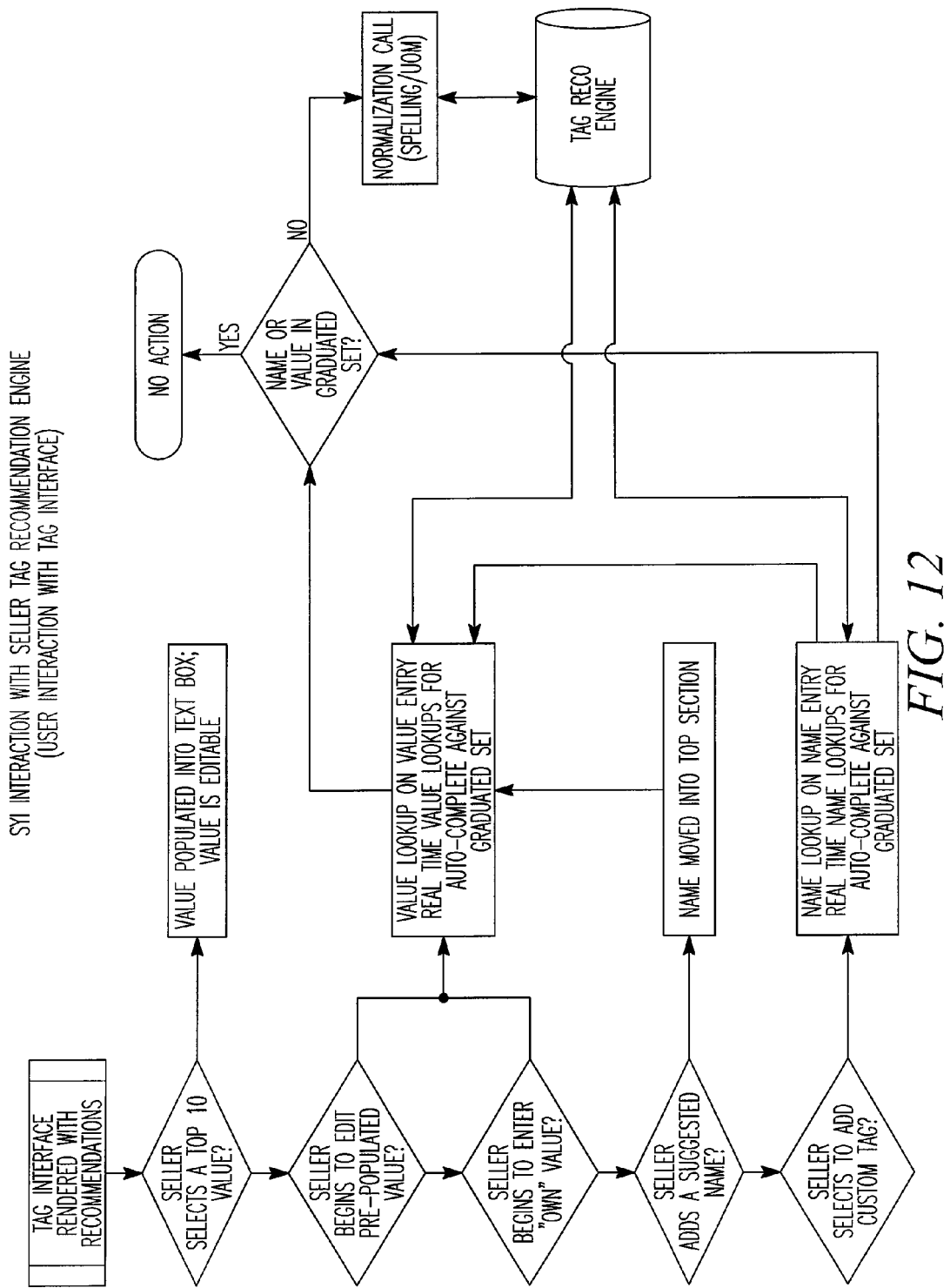
FIG. 12 illustrates the interaction between the SYI interface and the tag engine in a particular embodiment.

FIG. 12 illustrates the interaction between the SYI interface and the tag engine 500 in a particular embodiment. Tags may be initially displayed with an empty or pre-populated value. A Drop-Down user interface may be provided to enable user selection of a particular tag. Clicking on the drop-down arrow may expose a layer of up to 10 most relevant values for each name as returned by the tag engine 500. If the tag engine 500 returns less than 10 values, all returned may be shown in the list. If the tag engine 500 does not return any values, then only "enter my own" may be selectable. Values may be alphabetically and numerically ordered with numbers first from lowest to highest. At the bottom of the list is the option to "Enter my own" value. If any portion of the layer extends below the visible part of the browser, the layer may expand above the text box. This mirrors the default behavior of traditional drop-down elements. Values in the auto-complete layer may be selected with the mouse cursor or up/down arrow keys on keyboard. The selected value is highlighted in grey. The value is populated into text box upon mouse click or by the Enter keystroke. As the seller begins to enter text in the box, the SYI interface may do lookups into pre-fetched name and value data after each keystroke in order to retrieve matching results. The top 10 results ordered by the tag engine 500 may be shown in the auto-complete box. If any portion of the layer extents below visible part of the browser, the layer may expand above the text box. Values in the auto-complete layer may be selected with the mouse cursor or up/down arrow keys on keyboard. Any tag which has already been used in the current listing may not be displayed again in the matching results. For example, if the Tag "Color" has already been used, this tag may not be displayed for use when a user enters a "c" into the custom name box. Selection of "Enter a custom detail" results in tag name and value box appearing at bottom of list of tags in the top section. When a custom tag is entered, a check is performed to make sure that the tag is not duplicative of another existing tag. This check may be case insensitive. In order to drive further convergence within tag values, we may perform spell checking on values entered by the seller. When a potential Unit of Measure (UOM) string is identified, we may steer the user to converge on a common way to describe UOM's. SYI may call the tag engine 500 with the "normalization" call any time a name or value is entered that is not in the graduated set. If a UOM suggestion is available, it may be returned.

Within the SYI interface as well as listings submitted via the API or seller tools, we may perform various forms of listing validation. The maximum number of seller confirmed tags that may be written on an item is a pre-defined maximum (e.g. 15). This number may be configurable to provide the ability to raise or lower it. In order to enforce this maximum number, as soon as 15 tags are inserted into the top section of the interface, we may remove the link to add another custom tag and insert a message to the user notifying them of the limit. We may enforce a maximum character count for both names and values for submitted tags. Within the SYI interface, this may be enforced by not allowing the user to enter more than the character limit. These limits may be configurable so that they can be raised or lowered at a later date. Users may not be permitted to enter the same tag name more than once. If a seller attempts to enter the same tag name more than once, they may be presented with an error message. Users may be restricted from entering profanity or blacklist words in tag fields in the same manner as title and description.

If sellers choose to revise their item and the item is in a non-restricted state, they may revise tags in the same circumstances that they may revise attributes. If the item is in semi restricted state (less then 12 hours left in the listing of a bid, or has been purchased), the tag interface may be read only. When "revise item" is selected, we may not update recommendations or tags within the tag interface. We may however update tag data including top 10 values per tag as well as suggested tags. If the seller selects to edit the title, we may follow the same behavior as SYI and update the tags listed below that were not populated with a value by the seller. Additionally, if the seller begins to edit tags, we may make real time calls to the tag engine 500 as done at time of initial listing. Upon completion of revising the item, it may be re-indexed and undergo final classification.

The view item page may be modified to show the seller tags. These may be displayed in a manner similar to the item specifics. Tags may be displayed in the order received from the seller. If attributes exist alongside tags on a given listing, attributes may be displayed first. If a tag does not have a value, the name may not appear. With attributes if a seller doesn't choose to fill in an attribute, the name still appears but the value appears as "- - -". If the listing is in a single category which has both attributes and seller tags, the name of the attributes domain may be suppressed in the attributes box. An example of a view item page with associated seller tags is shown in FIG. 13.

One example embodiment may provide light editorial control of the seller tag space. The editorial control option can influence the tag engine 500 rather than explicitly defining tags and their display. In this example embodiment, the community (wisdom of the masses) may normalize and converge on a common hierarchy and we may only be providing input to guide that convergence. A "View Tag Names" function may be created and anchored off of the domain and category explorers. Once the user has selected a domain or category to view, all tag names for that domain may be returned. Tags may be ordered by priority as defined by the tag engine 500. The tag list may have the following columns: Tag name, Item count, Graduated categories, and Un-graduated categories. When viewing the tags, a user may be able to rate any given tag with a "Thumbs Up" or "Thumbs Down" selection. The result of giving a thumbs up/down selection are as follows. For a Thumbs Up selection, the tag name is moved to a top of priority list position for the next pre-defined number (e.g. 14) days. After the predefined number of days, the tag may no longer be forced to the top of the list, but may likely be included in the graduated set on its own merit; because it has been recommended to the sellers for 14 days. If multiple tag names in a given domain are given a thumbs up selection, the secondary sort may be by count and the last sort may be alphabetical. For a Thumbs Down selection, the tag name is removed from the graduated set for the next pre-defined number (e.g. 14) of days.

There may be some cases where early in the life of tag data for a particular domain, we may want to manually add a tag name to the graduated set. This could be done if we want to get people to converge on using a synonym for an already graduated set. It may also be done when we have little or no data for a given domain/category. In this circumstance we may manually provide a few tags so that the first one of the sellers experience with the tag interface is not completely empty.

In a particular embodiment, functionality for entering a tag may be as follows. A user may select a domain and choose to manually enter a tag name. The user can be someone other than the seller or a host site representative. A user allowed to enter or modify a tag can be anyone in the community of users who use the host site. Upon adding the tag, the tag name may be treated in the same way as if it already existed and was given a thumbs up selection by other users. This means the new user-entered tag name may be placed at the top of the list, and included in the graduated set for the next pre-defined number (e.g. 14) days. After 14 days, the tag may either remain in the graduated set by its own merit or be removed from the graduated set.

In a particular embodiment, functionality for modifying a tag may be as follows. A user may select a domain and choose an existing tag name. The user can be someone other than the seller or a host site representative. A user allowed to enter or modify a tag can be anyone in the community of users who use the host site. Upon selecting the tag, the user can modify the tag as s/he wishes. Then, the modified tag name may be treated in the same way as if it already existed and was given a thumbs up selection by other users. This means the user-modified tag name may be placed at the top of the list, and included in the graduated set for the next pre-defined number (e.g. 14) of days. After 14 days, the modified tag may either remain in the graduated set by its own merit or be removed from the graduated set.

An embodiment may provide the ability to publish tags independently of publishing a domain. This may allow for users to make tag changes and not publish the domain and vice versa. After making a tag change, a tag publish operation may be required for the change to be pushed live. Tag changes and publishes may be tracked by user. Changes made in a category or domain may not be mapped to the corresponding domain/categories until the offline graduation process occurs. Once a change is published it may be picked up by the offline graduation process within the next 24 hours.

An embodiment may provide the service of category to domain mapping for the tag engine 500. This may allow the tag engine 500 to store tags in a domain-centric way, while still retaining category driven weighting. Seller tagging data may be downloaded via the standard update process. If the user has already selected categories that s/he wants to download, the item specifics (i.e. tags) for the selected categories may be downloaded for the categories manually selected by the user. It may download the graduated set of tags for each category selected. A lookup for the categories the user has listed items/templates in may not be performed. If sellers choose to revise their item, they may revise tags in the same circumstances that they may revise attributes. When "revise item" is selected, recommendations or tags within the tag interface may or may not be updated. However, tag data including top 10 values per tag as well as suggested tags may be updated. If the seller selects to edit the title, the same behavior as "Create Item" may be followed and the tags listed below that were not populated with a value by the seller might be updated. Additionally, if the seller begins to edit tags, real time calls [online mode only] to the tag engine 500 might be made, as done at time of initial listing. Upon completion of revising the item, it may be re-indexed and undergo final classification as in the Revise Your Item (RYI) interface.

Seller tags may be available via a template generator. Files may include information messages related to Seller tags. The Template generator may add a new column for each tag name with the pre-fix of "T:", similar to the header of attributes. For example: T:TagName1, T:TagName2, . . . . For each tag name, an information message may be added to display the recommend values for the tag. For example:

Info>>>The recommended value(s) for tag TagName1: value1_1; value1_2, . . .

Info>>>The recommended value(s) for tag TagName2: value2_1; value2_2, . . .

In a particular embodiment, an application programming (API) interface provides access to tags for particular items. A description of a few of the related API calls is provided below.

GetItemRecommendations

This API call provides a tag recommendation portion of the call that may be called independently of other recommendation functions in the call. A user passes in a listing via the call and the API returns recommended tags (names and values) for that listing. A "tag" may be a name/value pair and may be returned complete (with name/value) or partial (name only). The call may accept either a listing that has not yet been created/listed on the host site, a partial listing (template), or an existing listing. Existing listings may be able to be referenced by an Item identifier (ID).

The tag engine 500 may take any combination of the data elements listed below as inputs in suggesting tags. The more inputs provided to the tag engine 500, the better the recommendations may be. Sellers may pass an entire listing to get tag recommendations back from the tag engine 500. Inputs to be used for the tag engine 500 include the seller category ID, and the Item title. Seller authored tags and product IDs may be additional inputs. Outputs produced by the tag engine 500 include tags returned in priority order by the tag engine 500. Tags may be returned to the GetItemRecommendation API in a similar manner in which they are returned to SYI interface. Up to a pre-determined limit (e.g. 10) tags as determined by the tag engine 500 may be returned to the API. Tags may be returned in priority order. An example of the GetItemRecommendation API is provided below.

Input:
Title: 30 GB Video iPod Black
Category: MP3 Players>Apple>30 GB
API Output:
Brand=Apple; Capacity=30 GB; Color=Black; Style=[blank]; Connector Type=[blank]; Weight=12 oz; Generation=[blank]; Display=Color; Length=3.8 in; Width=1.9 in AddItem This API call provides functionality to add an item. The add item family of calls may accept tags. Tags may be contained within one multi-value field. Tags may be supplied as text strings in name/value format. As with SYI interface, listings sent through the AddItem calls may be eligible to list in two categories. The result is that there might be listings with two tag enabled categories, 1 tag enabled and 1 attribute enabled, etc. At a high level, the current conventions may be followed with the following rules for tag enabled categories: A given item may have only one set of tags stored on it. This means there may be only one field for tags per listing in the API. A given listing could have attributes and tags if there was a category selected for each.

GetItem

This API call provides functionality to get an item. The GetItem call may return tags when tags have been supplied by the seller or another user. Confirmed tags may be returned as those are the ones visible on the View Item page. The format of tags returned in GetItem may match that of tags supplied in AddItem calls.

GetTagsByCategory

This call provides functionality so that a seller, developer, or other user may find out what the most relevant tags and values are for a given category. By providing this information, we may provide guidance to sellers and users on what may be included in their system as well as help to converge on the language by which sellers describe their items. Unlike the current attribute system, there may not be versioning of this new system. Because it is a living/breathing hierarchy powered by community data, the tag data may be changing on a regular basis. System updates may happen on a daily basis. This means that sellers may have to identify the right timeframe to get regular updates to the data. Inputs to be used for the tag engine 500 include Category ID, Timestamp or version, Category IDs (optional), and Title (optional). Outputs produced by the tag engine 500 include up to 30 top tag names (tag engine 500 may not supply 30 if there are less than 30 graduated tags for a given category) and up to 30 top tag values per name. The number of names and values included in the output may be configurable. An example of the GetTagsByCategory API is provided below.

Input:
Category=63852 (Clothing, Shoes & Accessories>Women's Accessories, Handbags>Handbags, Bags)
API Output:
Brand: Gucci, Banana Republic, Chloe, Fendi, Fossil, Gap, Guess, [more]
Style: Backpack, Diaper Bag, Evening Bag, Messenger Bag, Sling, [more]

GetValuesForName

This call may be used to get a full list of values for the name provided. This may be a Public API call. An example of the API call is provided below.
Input
Category ID, name, max value, site ID
Output
Values for the name Selected tag values may be indexed into their own namespace and made available to keyword search. Tag indexing can improve search recall and improve finding efficiency/conversion. Tag indexing can provide value added benefit to sellers and provide encouragement for feature adoption by sellers. In order to avoid indexing poor or irrelevant tags, we may implement rules to choose which tag values are indexed for each item. In a particular embodiment, a maximum number (e.g. 5) of tag values will be indexed. The tag values may be graduated. An implementation may first select values of the top three names for a category (if available). For subsequent tags, the next most confident tags may be selected. Values may meet a minimum confidence threshold. Tags may undergo re-indexing only when an item is revised or re-listed. Even though the graduated set may be changing and an indexed value may no longer be in the set, we may not re-index all values on each update to the graduated set. Tags may not be changing so frequently that this may be required. Additionally, it may be a significant capacity increase with a questionable benefit.

Figure 14:
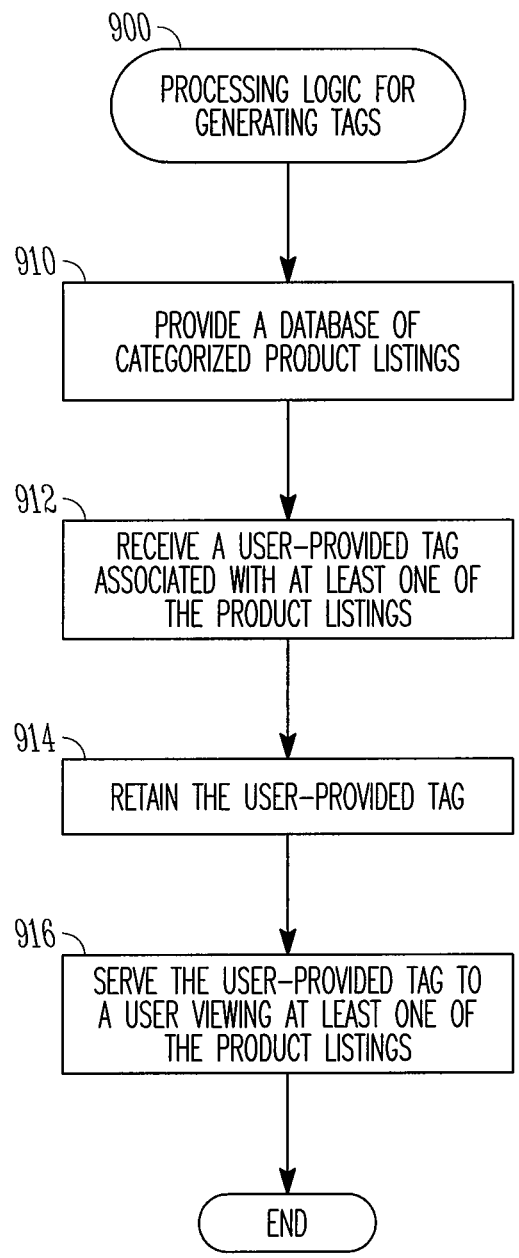
FIGS. 14 and 15 are processing flow diagrams of an example embodiment.

FIG. 14 illustrates a processing flow diagram of a particular embodiment. In the illustrated embodiment, the disclosed system and method provide a database of categorized product listings (processing block 910); receive a user-provided tag associated with at least one of the product listings (processing block 912); retain the user-provided tag (processing block 914); and serve the user-provided tag to a user viewing at least one of the product listings (processing block 916).

Figure 15:
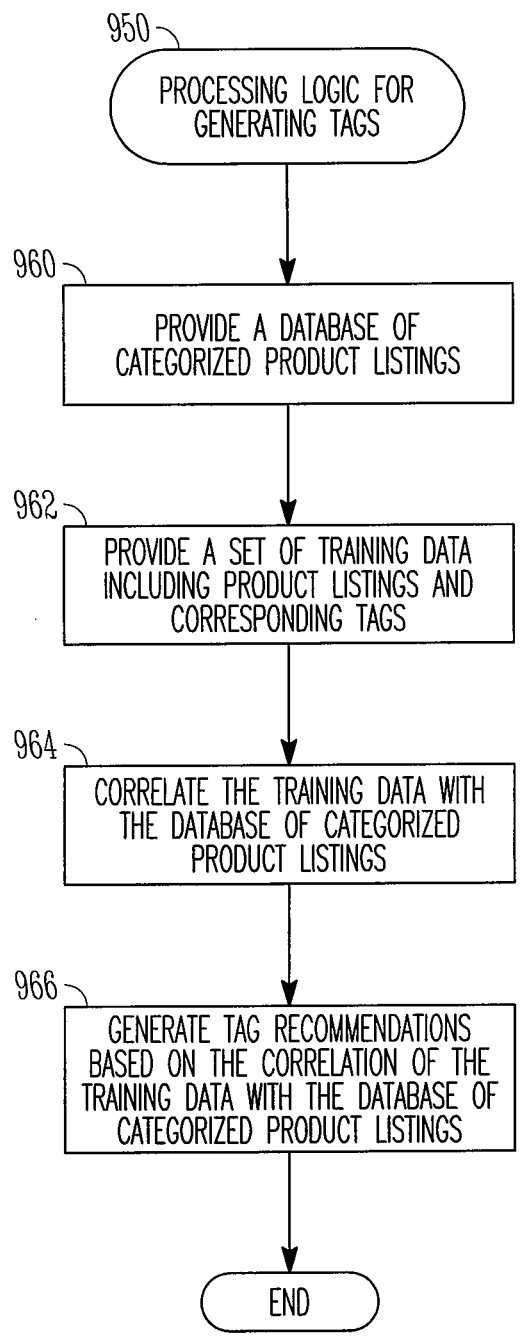

FIG. 15 illustrates another processing flow diagram of a particular embodiment. In the illustrated embodiment, the disclosed system and method provide a database of categorized product listings (processing block 960); provide a set of training data including product listings and corresponding tags (processing block 962); correlate the training data with the database of categorized product listings (processing block 964); and generate tag recommendations based on the correlation of the training data with the database of categorized product listings (processing block 966).

Platform Architecture

FIG. 1 is a network diagram depicting a client-server system 100, within which one example embodiment may be deployed. A networked system 102, in the example forms a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Marketplace Applications

Figure 2:
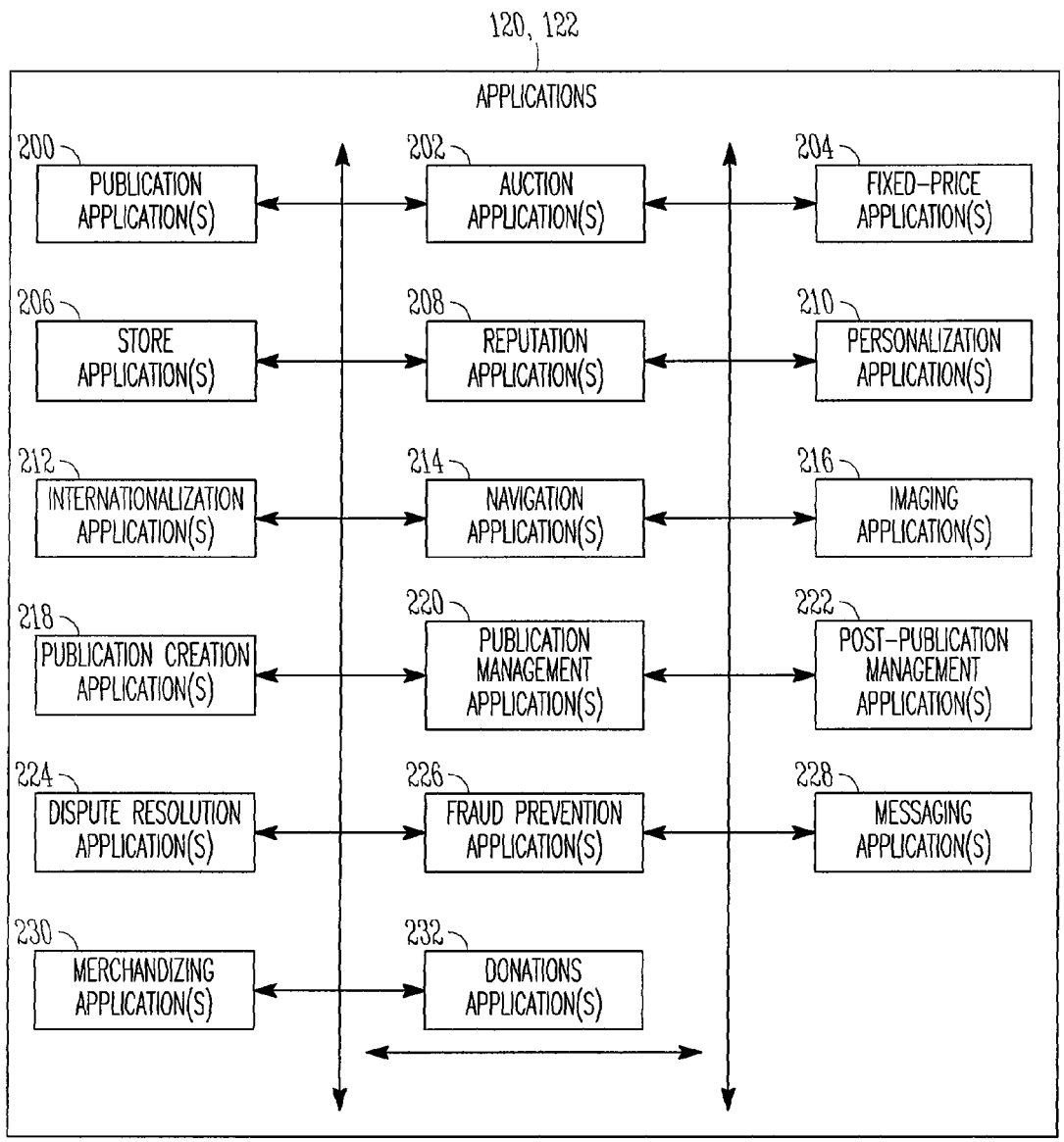
FIG. 2 is a block diagram illustrating multiple applications that, in one example embodiment, are provided as part of the networked system.

FIG. 2 is a block diagram illustrating multiple applications 120 and 122 that, in one example embodiment, are provided as part of the networked system 102. The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102. The above described tag engine 500, in example embodiment, forms a component or module of the listing creation applications 218.

Listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102. Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one have a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed.

Modules, Components and Logic

Certain embodiments are described herein as including logic or a number of modules, components or mechanisms. A module, logic, component or mechanism (herein after collectively referred to as a "module") may be a unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 3:
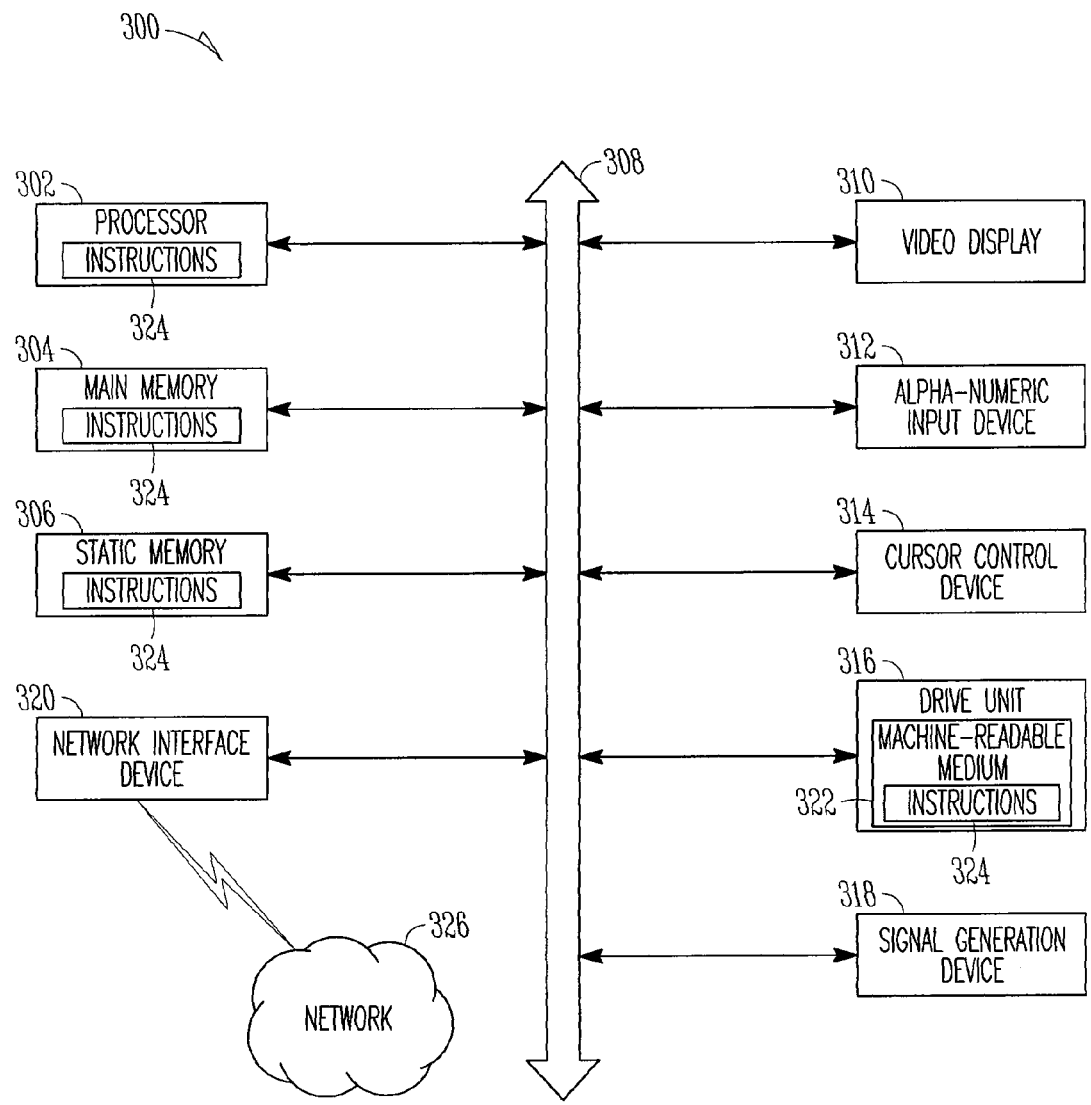
FIG. 3 is a block diagram of machine in the example form of a computer system within which instructions, for causing the machine to perform any one or more of the methodologies discussed herein, may be executed.

FIG. 3 is a block diagram of machine in the example form of a computer system 300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

Machine-Readable Medium

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 324 may further be transmitted or received over a communications network 326 using a transmission medium via the network interface device 320 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Example embodiments may include the above described tiers, and processes or operations about constituting these tiers may be implemented as components. Common too many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Thus, a computer-implemented system and method for providing information tagging in a networked system is disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
   providing a database of item listings;
   receiving user-provided tags, each of the user-provided tags associated with at least one of the item listings, each of the user-provided tags including a tag name and a tag value representing a name/value pair of an item attribute from a product category and tag metadata, the tag metadata including a descriptor of at least one of the tag name or the tag value indicating whether a user-provided tag is included within a graduated subset of a seller tag namespace, the graduated subset of the seller tag namespace representing user-provided tags that meet a graduation threshold, the graduation threshold is based on a combination of popularity score, a minimum item count, and a time factor relevant to the current date of the user-provided tags of the item attribute from the product category, the popularity score is determined by a count of the name/value pair and a total item count of the user-provided tags of the item attribute from the product category;
   identifying a group of the user-provided tags from the graduated subset of the seller tag namespace to recommend for an item listing; and serving, by use of a processor, the recommended group of the user-provided tags from the graduated subset of the seller tag namespace to a user viewing the item listing, the recommended group of the user-provided tags including name/value pairs of the item attribute from the product category that the user can select.

2. The method as claimed in claim 1 including associating a confidence factor with each of the tags in the recommended group of the user-provided tags.

3. The method of claim 1, wherein the user-provided tag included within the graduated subset of the seller tag namespace includes at least some of the user-provided tags indexed as keywords that can be leveraged for indexing at least one of the item listings.

4. The method of claim 1, further comprising:
configuring the graduation threshold specific for the product category or globally for multiple product categories.

5. The method of claim 1, further comprising:
generating a prioritized list of tags from the recommended group of the user-provided tags; and
providing, to a user, the tag names in a priority order specified by the priority list that are within the graduated subset of the seller tag namespace.

6. The method of claim 1, wherein identifying a group of the user-provided tags from the graduated subset of the seller tag namespace to recommend for one of the item listings comprises:
generating the recommended group of the user-provided tags for one of the item listings based on a correction of training data and the database of item listings.

7. The method of claim 6, wherein the training data represents data from the graduated subset of the seller tag namespace.

8. The method of claim 1, further comprising determining whether the user-provided tags meets the graduation threshold using an offline process.

9. An apparatus comprising:
at least one processor;
memory to store instructions that, when executed by the at least one processor, causes the at least one processor to:
receive user-provided tags, each of the user-provided tags associated with at least one of the item listings, each of the user-provided tags including a tag name and a tag value representing a name/value pair of an item attribute from a product category and tag metadata, the tag metadata including a descriptor of at least one of the tag name or the tag value indicating whether a user-provided tag is included within a graduated subset of a seller tag namespace, the graduated subset of the seller tag namespace representing user-provided tags that meet a graduation threshold, the graduation threshold is based on a combination of popularity score, a minimum item count, and a time factor relevant to the current date of the user-provided tags of the item attribute from the product category, the popularity score is determined by a count of the name/value pair and a total item count of the user-provided tags of the item attribute from the product category;
identify a group of user-provided tags from the graduated subset of the seller tag namespace to recommend for an item listing; and
serve the recommended group of the user-provided tags from the graduated subset of the seller tag namespace to a user viewing the item listing, the recommended group of the user-provided tags including name/value pairs of the item attribute from the product category that the user can select.

10. The apparatus as claimed in claim 9, wherein the instructions that, when executed by the at least one processor, causes the at least one processor to:
generate, using the at least one processor, a prioritized list of the tags from the recommended group of the user-provided tags; and
provide, to a user, the tag names in a priority order specified by the priority list that are within the graduated subset of the seller tag namespace.

11. The apparatus as claimed in claim 9, wherein the instructions that, when executed by the at least one processor, causes the at least one processor to associate a confidence factor with the tag recommendations.

12. An article of manufacture comprising a non-transitory machine-readable storage medium having machine executable instructions embedded thereon, which when executed by a machine, cause the machine to:
process a database of item listings;
receive user-provided tags, each of the user-provided tags associated with at least one of the item listings, each of the user-provided tags including a tag name and a tag value representing a name/value pair of an item attribute from a product category and tag metadata, the tag metadata including a descriptor of at least one of the tag name or the tag value indicating whether a user-provided tag is included within a graduated subset of a seller tag namespace, the graduated subset of the seller tag namespace representing user-provided tags that meet a graduation threshold, the graduation threshold is based on a combination of popularity score, a minimum item count, and a time factor relevant to the current date of the user-provided tags of the item attribute from the product category, the popularity score is determined by a count of the name/value pair and a total item count of the user-provided tags of the item attribute from the product category;
identify a group of the user-provided tags from the graduated subset of the seller tag namespace to recommend for an item listing; and
serve the recommended group of the user-provided tags from the graduated subset of the seller tag namespace to a user viewing the item listing, the recommended group of the user-provided tags including name/value pairs of the item attribute from the product category that the user can select.

13. The article of manufacture as claimed in claim 12 wherein the machine executable instructions further configured to cause the machine to create a list of user-provided tags.

14. The article of manufacture as claimed in claim 12 wherein the machine executable instructions further configured to cause the machine to:
generate, using the at least one processor, a prioritized list of the tags from the recommended group of the user-provided tags; and
provide, to a user, the tag names in a priority order specified by the priority list that are within the graduated subset of the seller tag namespace.

\* \* \* \* \*